Sept. 13, 1966 S. P. JACKSON 3,273,071

MAGNETIC AMPLIFIER

Filed July 11, 1962

Inventor
Stuart P. Jackson

By Anthony D. Cennamo
Attorney

United States Patent Office 3,273,071
Patented Sept. 13, 1966

3,273,071

MAGNETIC AMPLIFIER

Stuart P. Jackson, Columbus, Ohio, assignor to Solidstate Controls, Inc., a corporation of Ohio Filed July 11, 1962, Ser. No. 209,063
5 Claims. (Cl. 330—8)

The present invention relates generally to magnetic amplifiers and more particularly to novel difference magnetic amplifier circuitry.

Magnetic amplifiers have been known for a number of years during a greater part of which time little advancement has been made. The primary reason for the virtual discarding of magnetic amplifiers was the belief that thermionic amplifiers were far superior in all respects, and consequently thermionic amplifiers had raced ahead of magnetic amplifiers in development. Vacuum tubes are, however, a very undesirable component in certain systems and particularly in warfare equipment, especially where reliability and ruggedness are essential. This fact was brought out late in the last war, where it became evident that magnetic amplifiers could be used to good advantage in many places where vacuum tubes were previously thought to be necessary. Developments in other electrical fields produced higher permeability magnetic alloys and dry-type rectifiers; materials that could be appled with great advantage to magnetic amplifier techniques to enhance the development of magnetic amplifiers.

In the present day electrical system, magnetic amplifiers find utility as a sensitive robust galvanometer, a pre-amplifier for an electronic amplifier when the incoming signal is direct current thereby functioning as a D.C.-A.C. converter; as a mixing device and amplifier in a series system; speed and frequency regulators; instrument amplifiers; to drive and control the reversal of an A.C. or D.C motor; and probably of most importance to drive a motor at a speed dependent on the value of the input signal. Other uses for magnetic amplifiers are, of course, known.

The present invention comprises a difference amplifier including a pair of loop circuits having a common arm and a gating winding connected between a source of operating potential and a resistive load. Signals to be amplified are applied to a control winding differentially coupled to each of the gating windings.

Accordingly, it is a primary object of the present invention to provide a difference magnetic amplifier.

It is another object of the present invention to provide a magnetic amplifier suitable for amplifying A.C. signals.

It is also an object of the present invention to provide a magnetic amplifier having improved linearity characteristics.

It is yet another object of the present invention to provide a magnetic amplifier having a low output impedance.

These and other objects and advantages of the present invention will become more apparent when the following description is taken in conjunction with the drawings.

Figure 1:
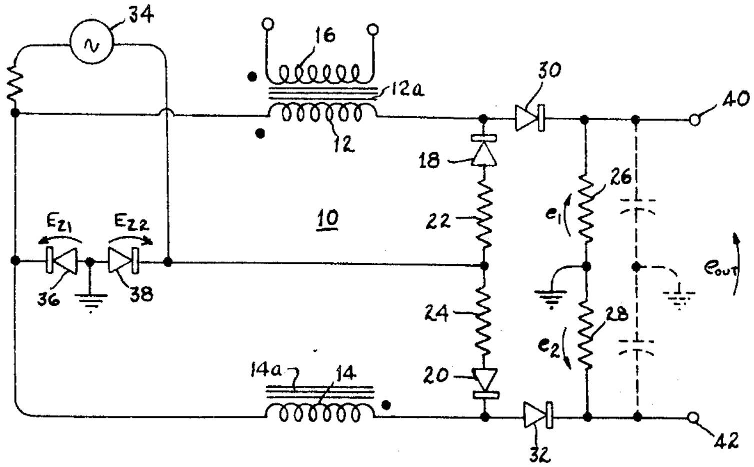
FIG. 1 is a schematic circuit diagram of a differential magnetic amplifier in accordance with the present invention.

Referring to the drawings and specifically to FIG. 1, a difference magnetic amplifier 10 comprises identical transformer gate windings 12 and 14 linked by a control winding 16. Reset diodes 18 and 20, resistors 22–28 and diodes 30, 32 are connected to one end of the gate windings. An A.C. source 34 supplies operating potential for the amplifier via a pair of rectifying diodes 36, 38. Output terminals 40, 42 provide a potential $E_o$ across load resistors 26, 28.

Figures 2, 3, 4, 5:
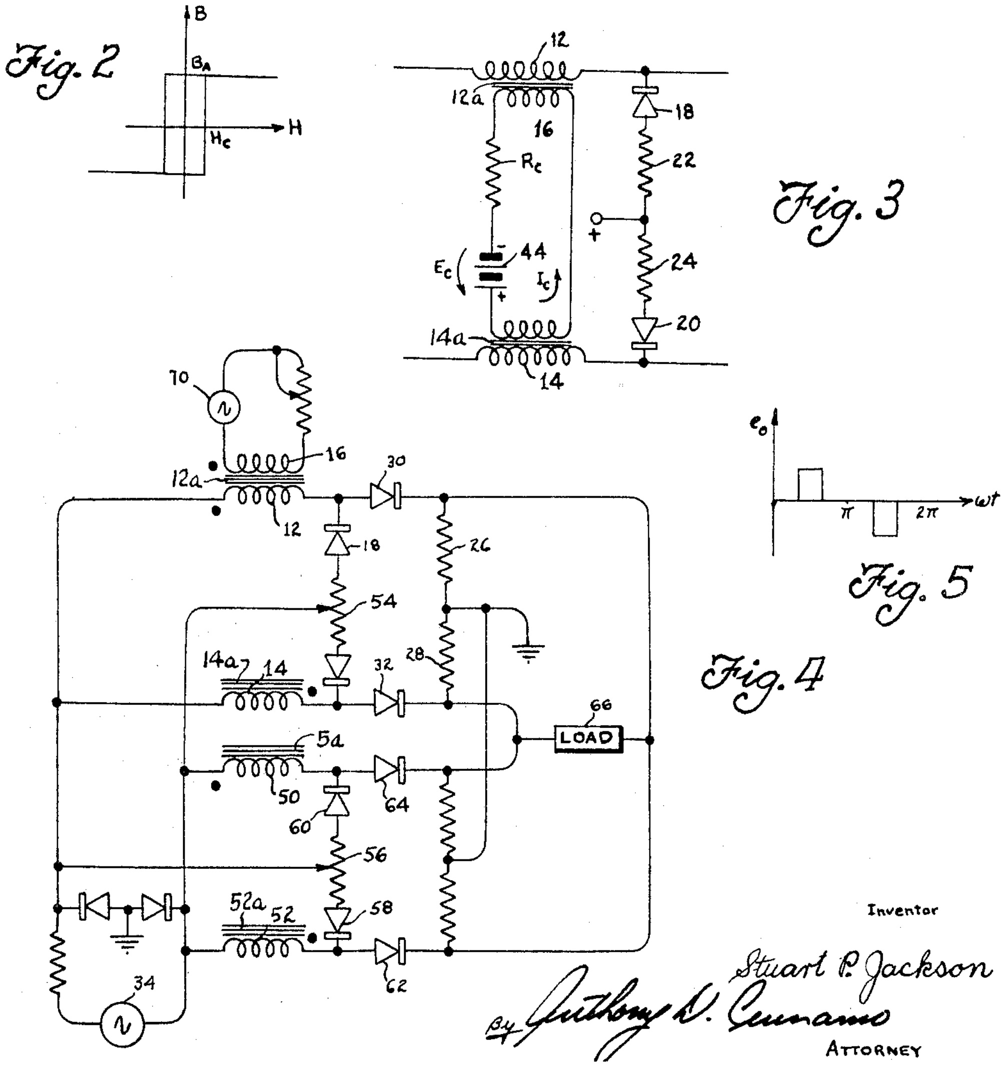
FIG. 2 is a sketch helpful in explaining the operation of the amplifier shown in FIG. 1.
FIG. 3 is a partial schematic diagram of the amplifier shown in FIG. 1.
FIG. 4 is a schematic circuit diagram of a magnetic difference amplifier similar to that shown in FIG. 1, but providing bi-directional output; and, FIG. 5 is a graph of output voltage vs. angle for the amplifier of FIG. 4.

With the control winding 16 open assuming a B-H core characteristic as shown in FIG. 2, at the point the cores reach saturation, the impedance of the cores becomes negligible. This change may occur at some arbitrary angle of the applied A.C. potential. The load voltages $$E_1=E_2=E_z\frac{\pi-\alpha}{2\pi} \qquad (1)$$

where $E_1$ and $E_2$ are average values. In order to achieve a useful output the control winding must cause an unequal change in the two gate cores.

Referring now to FIG. 3, during a reset half-cycle of applied A.C., a control source 44 providing an output $E_c$ is shown connected to the control winding. For the case of $E_c=0$, exciting current flows through the reset resistors. With balanced conditions, both cores are reset an equal amount Thus, the induced voltages cancel and no control current flows. When $E_c$ does not equal zero, a control current $I_c$ flows. In core 12*a* the control current supplies a portion of the exciting current reducing that portion of exciting current through resistor 22. This increases the voltage across gate winding 12. The control current is in a direction to produce a load current for core 14*a*, increasing the current through reset resistor 24 and decreasing the voltage supplied to gate winding 14. The unbalance in voltages induced in the control winding 16 influences the flow of control current.

The firing angles for the two gate winding can be shown to be $$1=\frac{E-R_{22}\frac{Hc_1}{ng_1}-\frac{Nc}{Ng}I_c}{E-\frac{R_{22}Hc_1}{Ng}} \qquad (2)$$

$$2=\frac{E-R_{24}\frac{Hc_1}{Ng}\frac{Nc}{Ng}I_c}{E-R_{22}\frac{Hc_1}{Ng}} \qquad (3)$$

where $Nc$=number of control winding turns
$Ng$=number of gate winding turns
$l$=total winding length Therefore from (1)

$$E_0=\frac{E_z}{2}(1-2) \qquad (4)$$

Also the output load current $$I_0=\frac{E_0}{R_0}$$

where $R_o$ is output impedance.

Combining these equations a current gain $$\frac{I_0}{I_c}=\frac{E_z\frac{R_{22}}{R_0}\frac{N_c}{N_g}}{E_z-R\frac{Hel}{Ng}} \qquad (5)$$

Current gains of the order of 750 or more have been measured. Control of the firing angle will provide a full range of output voltages; however, it is adjustable to only those angles of the input waveform up to where the reference diodes 36, 38 clip.

The circuits of FIGS. 1 and 3 have been described as providing a D.C. output potential in response to a step change in control winding current $I_c$. The amplitude of the pulse output will be the value computed from Eq. 4. By adding another circuit to those shown in FIGS. 1 and 3 there may be provided a bi-directional output voltage in response to an A.C. excitation signal applied to the control winding 16. The bi-directional output voltage is especially desirable in the numerous applications requiring amplification of sinusoidal voltages and currents.

With reference now to FIG. 4, another pair of control windings 50 and 52 also magnetically linked to the control winding 16 are connected to one side of the A.C. main supply 34 and the gate windings 12 and 14 are connected to the other side. The reset resistances are replaced by a potentiometer 54 and 56. The movable arm of each of these potentiometers is returned to a different side of the main supply. The added double loop circuit is substantially identical to the one shown above in FIG. 1 and includes reset diodes 58, 60 and output diodes 62 and 64. The output terminals are essentially connected in parallel across a load 66 which may of course comprise the input to succeeding amplifier stages.

The operation of this circuit is similar to that described herein above. An A.C. source 70 connected to the control winding 16 causes a load component of current to flow during both halves of the A.C. supply waveform. The magnitude of this component is in accordance with the magnitude of excitation exerted in the control winding. The upper circuit provides a differential component of load current whenever the control winding excitation goes in one direction. And the lower double loop circuit causes a load component of current upon a reverse in the excitation voltage polarity. The result is a bi-directional output signal of a waveshape and proportional to the amplitude of the excitation signal. This potential is developed through an exceeding low output impedance which substantially eliminates problems of matching into high impedance amplifier circuitry or similar load devices. By experimenting with different combinations of core material and winding lengths and turns, it is possible to provide a very stable high gain amplifier with the teachings of the present invention.

With reference now to FIG. 4, an amplifier is illustrated which will provide a bi-directional output pulse in response to polarity changes in the control current $I_c$. In addition to the circuitry described in FIG. 1 another pair of control windings 50, 52 magnetically linked by a control winding 54 are utilized. Diodes 56–62 and load stabilizing resistors 64, 66 are used. The core flux reset resistance are combined into a pair of potentiometers 68, 70.

The operation is similar to that of the preceding circuit except that both halves of the A.C. supply cycle are used. The pulse output is shown in FIG. 5. Since the output is bi-directional, an A.C. amplifier may follow to provide further amplification. D.C. restoration may be provided by a rectifier in a manner well known to those skilled in the art.

While the present invention has been described in terms of specific preferred apparatus, it should be apparent that many additions, substitutions and modifications may be made in the illustrated embodiments without detracting from the original spirit and scope of the present invention or relinquishing any of its attendant advantages.

What is claimed is:

1. A difference amplifier comprising a first and a second loop circuit having a common arm, a gate winding connected in opposition in each of said loop circuits, a source of D.C. reference potential connected between one end of said common arm and one end of said gate winding, a pair of serially connected reset resistors and diodes connecting the other end of said common arm to the other end of said gate windings, a pair of second diodes, a pair of load resistances, means for serially connecting one of said second diodes and a load resistor to one of said other ends of one of said gate windings means for serially connecting the other of said second diodes and a load resistor to the other end of said other gate winding, the said pair of series connected networks having a junction point connected therebetween, a pair of output terminals across said load resistors, a control winding differentially linking both of said gate windings, a source of direct current control voltage, means for coupling said direct current voltage across said control winding wherein the said voltage is applied through the oppositely poled gate windings and circuitry thereof for producing in the output circuit a difference signal a voltage difference across said output terminals in accordance with the magnitude of current flowing in said control winding.

2. The amplifier as set forth in claim 1 in which a pair of potentiometers are substituted for said core resetting resistors.

3. The amplifier as set forth in claim 1 in which a pair of filter capacitors are connected across said output terminals.

4. The amplifier as set forth in claim 1 which further includes third and fourth loop circuits connected in parallel with said first and second loop circuits, a source of alternating potential for energizing said control winding, and a load connected between said parallel-connected loop circuits for providing a bi-directional pulse output voltage in accordance with the polarity changes of said control winding energizing source voltage.

5. The amplifier as set forth in claim 4 in which a pair of potentiometers are substituted for said core resetting resistors.

References Cited by the Examiner

UNITED STATES PATENTS

| | | | |
|---|---|---|---|
| 2,767,367 | 10/1956 | Black | 323—89.1 X |
| 2,904,744 | 9/1959 | De Lalio | 323—89.42 |

ROY LAKE, *Primary Examiner.*

N. KAUFMAN, *Assistant Examiner.*